US012096717B2

United States Patent
Advani et al.

(10) Patent No.: US 12,096,717 B2
(45) Date of Patent: *Sep. 24, 2024

(54) MONITORING DEVICE FOR MONITORING CROP YIELD

(71) Applicant: Deere & Company, Moline, IL (US)

(72) Inventors: Gurmukh H. Advani, West Fargo, ND (US); Noel W. Anderson, Fargo, ND (US); Kevin P. Cowles, Fargo, ND (US); Michael L. Rhodes, Richfield, MN (US)

(73) Assignee: Deere &Company, Moline, IL (US)

( * ) Notice: Subject to any disclaimer, the term of this patent is extended or adjusted under 35 U.S.C. 154(b) by 1038 days.

This patent is subject to a terminal disclaimer.

(21) Appl. No.: 17/028,497

(22) Filed: Sep. 22, 2020

(65) Prior Publication Data

US 2021/0000011 A1  Jan. 7, 2021

Related U.S. Application Data

(63) Continuation of application No. 15/967,598, filed on Apr. 30, 2018, now Pat. No. 10,820,503.

(Continued)

(51) Int. Cl.
*A01D 41/127*  (2006.01)
*G01F 1/30*  (2006.01)
(Continued)

(52) U.S. Cl.
CPC ..... *A01D 41/1271* (2013.01); *A01D 41/1272* (2013.01); *G01F 1/80* (2013.01);
(Continued)

(58) Field of Classification Search
CPC ............ A01D 41/1272; A01D 41/1271; A01D 41/127; A01D 41/1208; A01D 43/085;
(Continued)

(56) References Cited

U.S. PATENT DOCUMENTS 3,888,389 A  6/1975  Oetiker
5,343,761 A  9/1994  Myers
(Continued)

FOREIGN PATENT DOCUMENTS

CN  1118873 A  3/1996
CN  101995284 A  3/2011
(Continued)

OTHER PUBLICATIONS

Brazilian Office Action issued in Patent Application No. 1020180164740, dated Jun. 27, 2022, in 04 pages.

(Continued)

*Primary Examiner* — Thomas B Will
*Assistant Examiner* — Robert E Pezzuto
(74) *Attorney, Agent, or Firm* — HANLEY, FLIGHT & ZIMMERMAN, LLC

(57) ABSTRACT

An example monitoring device for monitoring crop yield is mounted to a housing of a grain elevator of an agricultural work machine proximate a crop conveyor assembly arranged in the housing and has at least one aperture formed therein. A material engagement member is arranged on the mounting structure and is pivotal with respect to the mounting structure about a pivot point. The material engagement member can comprise a first end and a second end opposite of the first end. At least one rotational sensor is arranged in the monitoring device and is configured to detect spatial movement or position of the material engagement member. A processing device is coupled to the at least one rotational sensor and is configured to determine an aggregate crop yield based on the detected rotational magnitude of the displacement of the first end or second end.

27 Claims, 11 Drawing Sheets

Related U.S. Application Data

(60) Provisional application No. 62/559,451, filed on Sep. 15, 2017.

(51) Int. Cl.
  *G01F 1/80* (2006.01)
  *A01D 61/00* (2006.01)

(52) U.S. Cl.
  CPC ........ *A01D 41/1274* (2013.01); *A01D 61/002* (2013.01); *G01F 1/30* (2013.01)

(58) Field of Classification Search
  CPC ..... A01D 61/00; A01F 12/46; A01F 15/0825; A01F 15/08; A01F 15/101; G01F 1/80; G01F 1/30; G01F 1/206; G01F 22/00; G01F 3/00; G01F 15/12; G01G 11/04; G01G 19/12
  See application file for complete search history.

(56) References Cited

U.S. PATENT DOCUMENTS

| | | | |
|---|---|---|---|
| 5,959,218 A | 9/1999 | Strubbe | |
| 5,970,802 A | 10/1999 | Strubbe | |
| 6,014,903 A * | 1/2000 | Strubbe | G01F 1/30 73/861.73 |
| 6,138,518 A | 10/2000 | Strubbe | |
| 6,272,935 B1 * | 8/2001 | Strubbe | G01F 1/206 73/861.73 |
| 6,820,459 B2 | 11/2004 | Beck et al. | |
| 6,899,616 B1 * | 5/2005 | Murray | A01D 41/1272 73/861.73 |
| 7,430,845 B2 | 10/2008 | Kormann et al. | |
| 9,506,786 B2 | 11/2016 | Strnad et al. | |
| 9,686,914 B2 | 6/2017 | Koch et al. | |
| 10,820,503 B2 | 11/2020 | Advani et al. | |
| 2018/0084720 A1 | 3/2018 | Brandmeier et al. | |
| 2018/0087939 A1 | 3/2018 | Brandmeier et al. | |
| 2019/0082594 A1 | 3/2019 | Rhodes et al. | |
| 2019/0082595 A1 | 3/2019 | Advani et al. | |

FOREIGN PATENT DOCUMENTS

| | | |
|---|---|---|
| CN | 202171479 U | 3/2012 |
| CN | 103808370 A | 5/2014 |
| CN | 105203168 A | 12/2015 |
| DE | 1802213 | 5/1970 |
| EP | 0208025 | 1/1987 |
| EP | 0853234 | 7/1998 |
| EP | 0877234 | 11/1998 |
| EP | 1169905 | 1/2002 |
| WO | 2013023142 | 2/2013 |
| WO | 2014210073 | 12/2014 |

OTHER PUBLICATIONS

Search Report issued in counterpart application No. EP18191540.6, dated Dec. 21, 2018, 2018, 7 pages.

Search Report issued in related application No. EP18188592.2, dated Dec. 21, 2018, 7 pages.

Park, J. W. "Piezoelectric Bedload Impact Sensor (PBIS) for Particle Size Distribution." Doctoral dissertation, University of Louisville [online], Dec. 2013 [retrieved on Feb. 6, 2017]. Retrieved from the Internet:<http://ir.library.louisville.edu/cgi/viewcontent.cgi?article- =2094&context=etd>.

United States Patent and Trademark Office, "Non-Final Office Action," issued in connection with U.S. Appl. No. 15/967,598, mailed on Mar. 10, 2020, 21 pages.

United States Patent and Trademark Office, "Notice of Allowance and Fee(s) Due," issued in connection with U.S. Appl. No. 15/967,598, mailed on Jul. 16, 2020, 11 pages.

Chinese Office Action issued in application No. 201810939015.2 dated Sep. 8, 2021, in 10 pages.

* cited by examiner

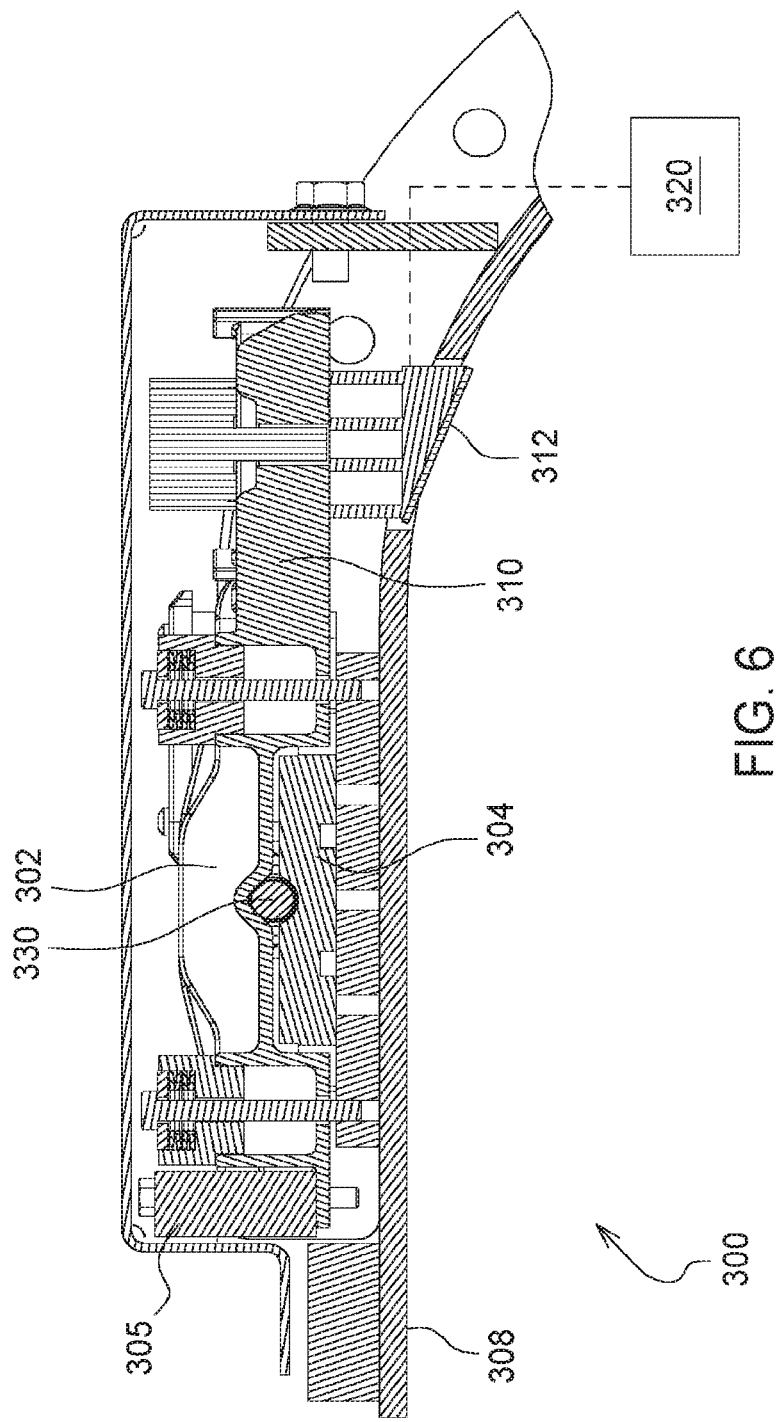

MONITORING DEVICE FOR MONITORING CROP YIELD

RELATED APPLICATION

This patent as a continuation of U.S. patent application Ser. No. 15/967,598, which was filed on Apr. 30, 2018, which claims priority to U.S. Provisional Patent Application 62/559,451, which was filed on Sep. 15, 2017. U.S. patent application Ser. No. 15/967,598 and U.S. Provisional Patent Application 62/559,451 are hereby incorporated herein by reference in their entireties. Priority to U.S. patent application Ser. No. 15/967,598 and U.S. Provisional Patent Application 62/559,451 is hereby claimed.

FIELD OF THE DISCLOSURE

The present disclosure relates generally to monitoring devices for monitoring crop yield.

BACKGROUND OF THE DISCLOSURE

During harvesting, the real-time monitoring and determination of crop yields is often desirable to improve harvesting operations and to provide pertinent information (e.g., crop performance) about the crop being harvested. For example, such information can be used to determine high and low performance areas, as well as for comparison purposes to compare the yield of a variety of seed types. The yield monitor for grain measures and records information such as grain flow, grain moisture, area covered, and location. Based on the measured yield, other properties may be determined such as moisture and grain flow.

Some conventional approaches have employed the use of translational (i.e., non-rotational and linear translation) sensor devices for measuring yields. However, significant disadvantages to translational sensor devices include decreased sensor resolution, increased measurement errors, and limited sensing ranges, thereby resulting in imprecise yield measurements which can be costly. Other conventional approaches have employed fill level sensors that determines mass flow based on a measured change in a dielectric constant of a parallel plate capacitor. Drawbacks to such conventional approaches include low sensor resolution and decreased sensing accuracy. As such, there is a need in the art for an improved monitoring device that overcomes the limitations of the conventional approaches.

SUMMARY OF THE DISCLOSURE

According to an aspect of the present disclosure, a monitoring device for monitoring crop yield. The monitoring device comprises a mounting structure mounted to a housing of a grain elevator of an agricultural work machine proximate a crop conveyor assembly arranged in the housing. The mounting structure comprises at least one aperture formed therein. A material engagement member is arranged in the monitoring device and is pivotal with respect to the mounting structure about a pivot point, the material engagement member having a first end and a second end opposite of the first end.

At least one rotational sensor configured to detect spatial movement or position of the material engagement member and output a signal corresponding to a rotational magnitude of displacement of the first end or second end of the material engagement member relative to the pivot point. The displacement is induced by the exertion of an angular force generated by an agricultural material engaged with a surface of at least one member of the material engagement member. The displacement of the first end or second end is proportional to a degree of pivotal movement of the material engagement member about a pivot point axis. A processing device coupled to the at least one rotational sensor and configured to determine to determine a mass flow rate of the agricultural material based on the detected rotational magnitude of the displacement of the first end or second end, and wherein an aggregate crop yield is determined based on the mass flow rate.

Other features and aspects will become apparent by consideration of the detailed description and accompanying drawings.

BRIEF DESCRIPTION OF THE DRAWINGS

The detailed description of the drawings refers to the accompanying figures in which:

FIG. 6 is a cross-sectional side view of a monitoring device according to an embodiment;

DETAILED DESCRIPTION OF THE DRAWINGS

Figure 7:
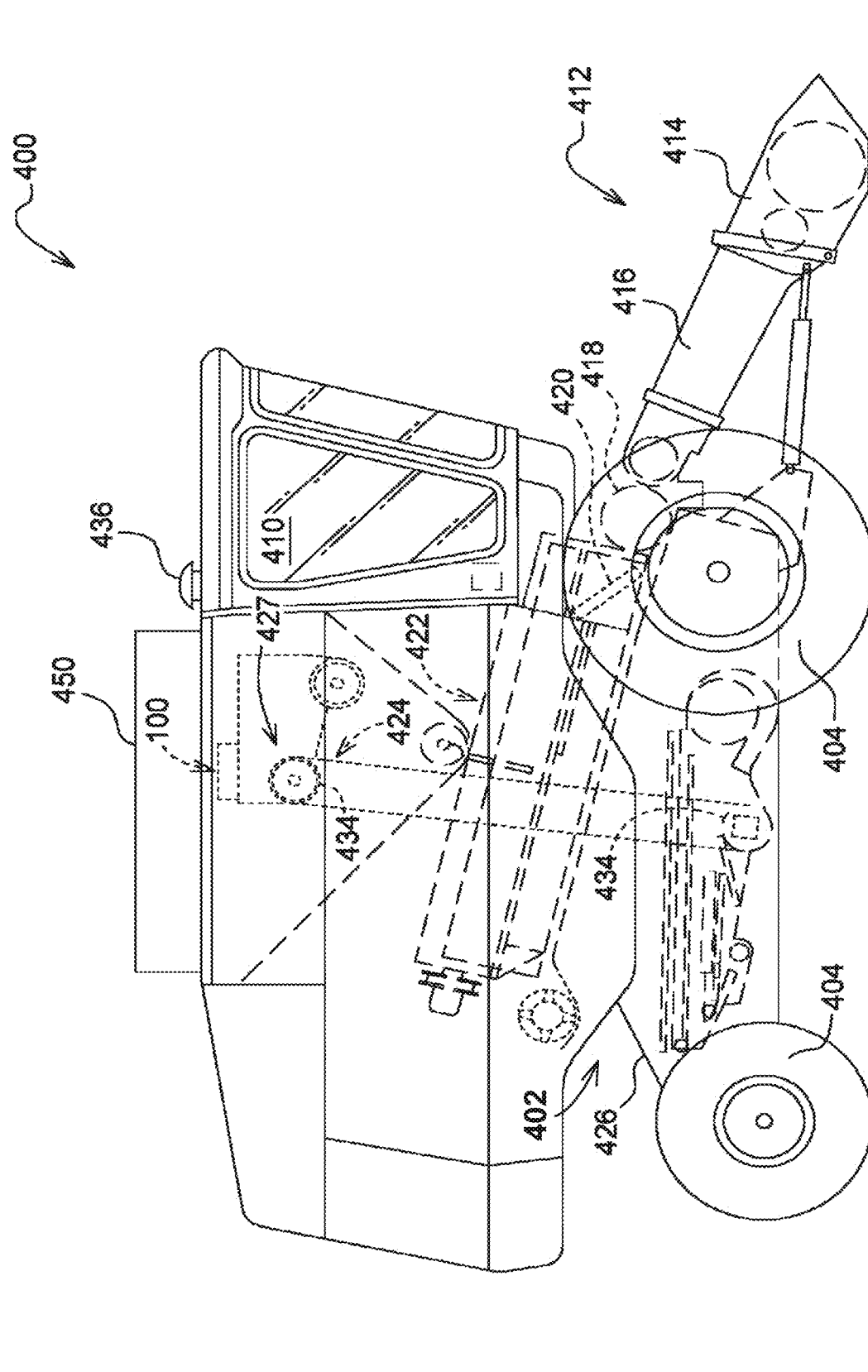
FIG. 7 is a side view of an agricultural work machine including an embodiment of the monitoring device of FIG. 1.
Figure 8:
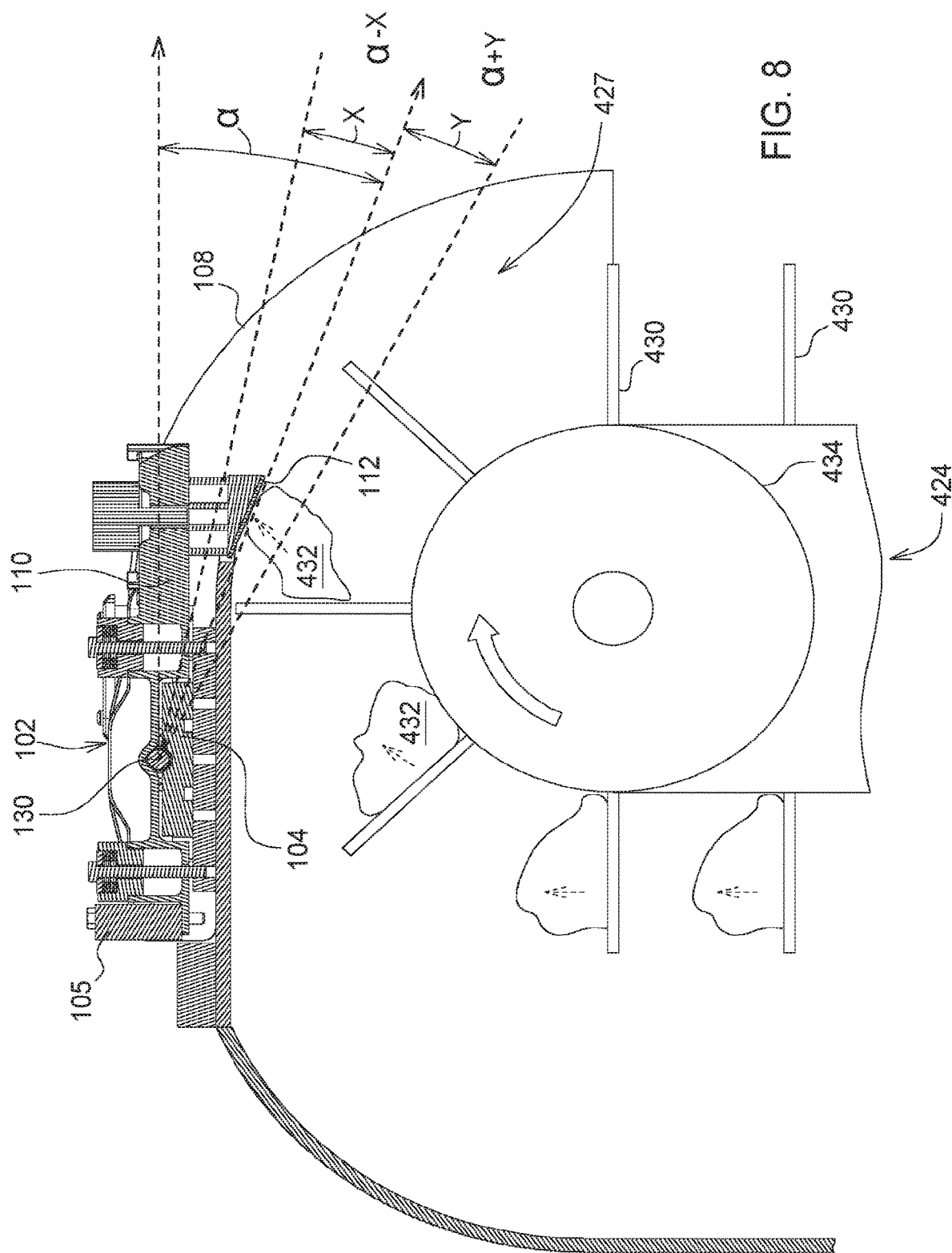
FIG. 8 is side view of the material engagement member of FIG. 1 arranged proximate a crop conveyor assembly arranged in the agricultural work machine of FIG. 7 according to an embodiment.

Referring to FIGS. 1A-4, a monitoring device 100 for monitoring crop yield is shown according to an embodiment. The monitoring device 100 can comprise a material engagement member 102, a fulcrum assembly 104, and at least one rotational sensor 106 collectively arranged on a mounting structure 108 proximate a crop conveyor assembly 424 located in an agricultural work machine 400 (FIGS. 7 and 8). For purposes of clarity, the present disclosure will be described as being implemented in an agricultural work machine including a harvester, however, it should be noted that the present disclosure may also be employed in other yield monitoring applications such as seeding.

In some embodiments, the mounting structure 108 is mounted proximate a rotating mechanism 434 arranged in the crop conveyor assembly 424 and can comprise at least one aperture 118 that is sized and dimensioned relative to a length of the material engagement member 102. For example, the positioning and structural geometry of the aperture 118 can and will vary based on the size and shape of at least one member of the material engagement member 102 (refer, e.g., to FIG. 4). The mounting structure 108 can comprise a mounting plate 120 having at least two side walls 122 extending in a direction substantially parallel to an upper planar surface 126 of the mounting plate 120. A plurality of mounting holes 127 can be spatially arranged on the upper planar surface 126 for receiving fasteners to secure placement of the fulcrum assembly 104 or other components to the mounting plate 120 in a variety positions. A rear panel 128 can be arranged to project upwardly and away from the mounting plate 120 rearward of the material engagement member 102.

Figure 1:
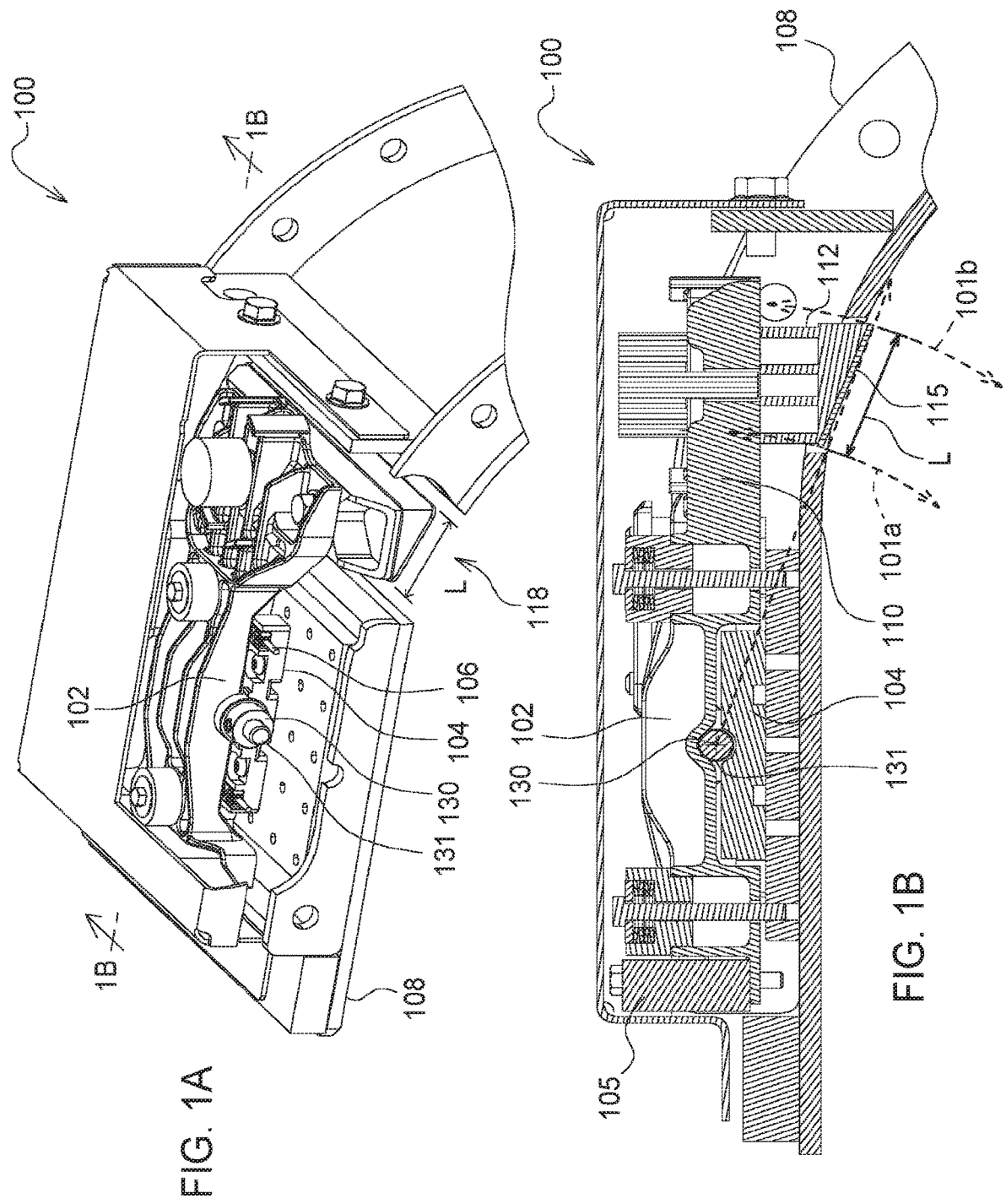
FIG. 1A is a perspective side view of the monitoring device of FIG. 1 according to an embodiment.
FIG. 1B is a cross-sectional side view of the monitoring device of FIG. 1 according to an embodiment.
Figure 2:
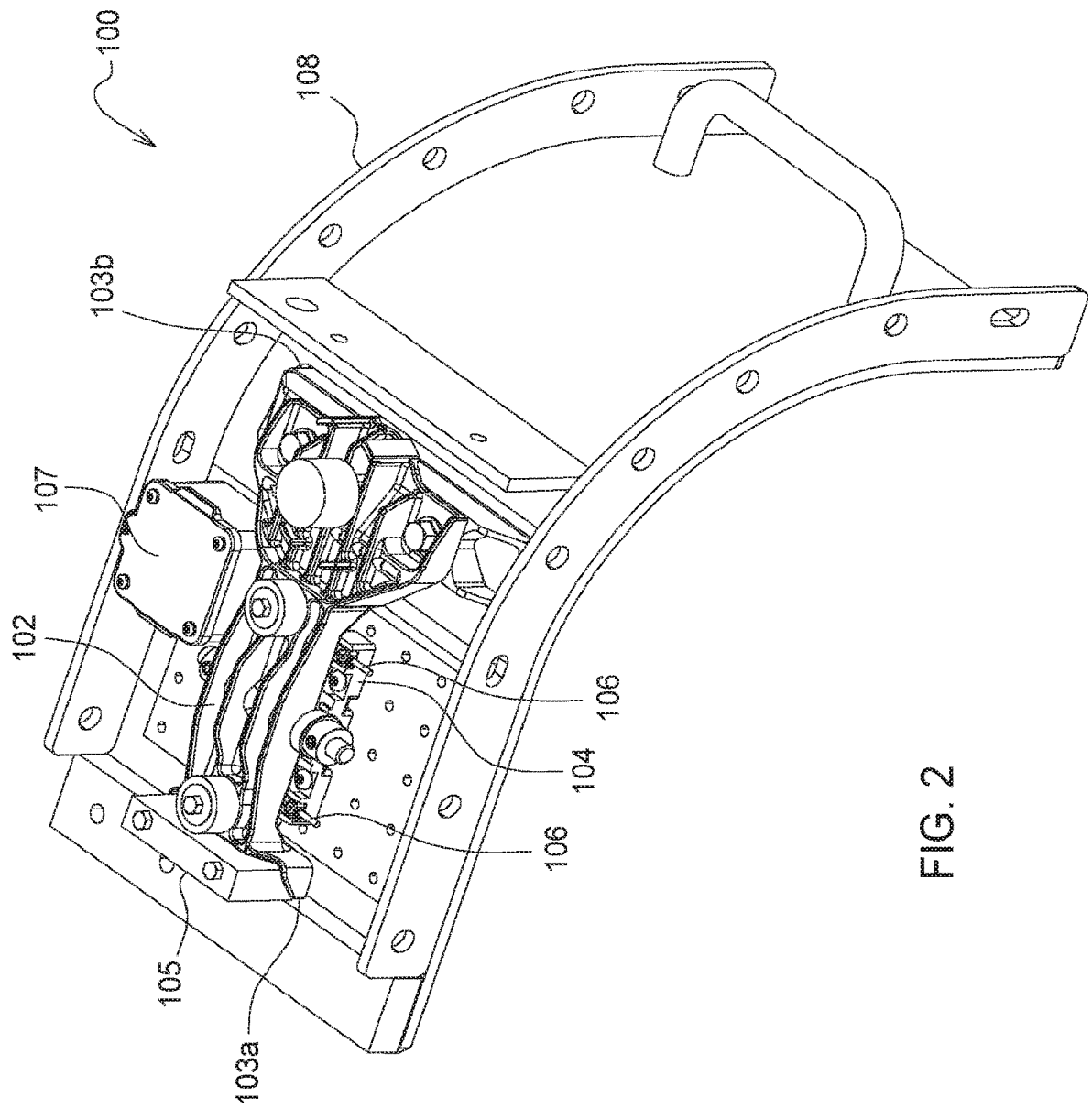
FIG. 2 is a top perspective view of the monitoring device of FIG. 1 according to an embodiment.
Figure 3:
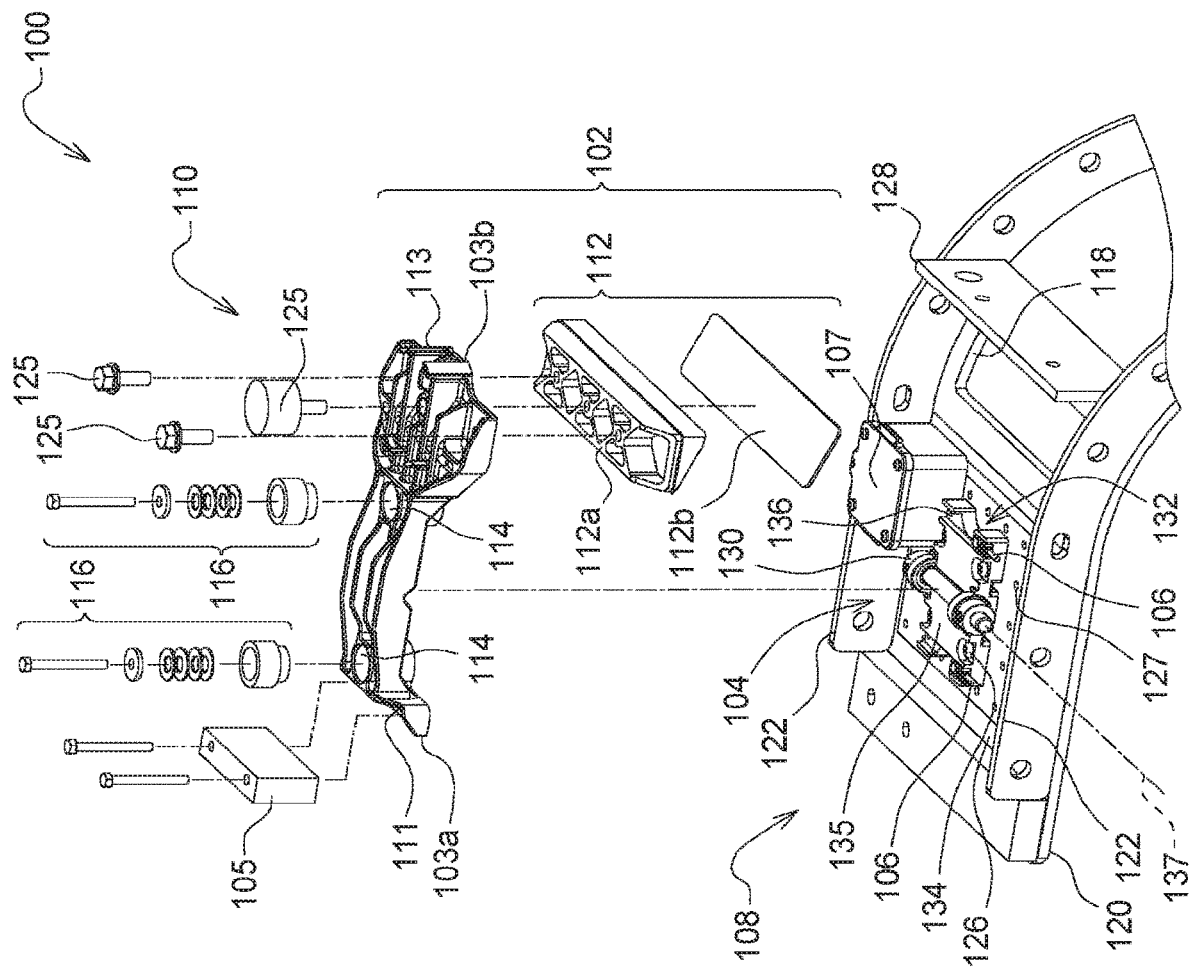
FIG. 3 is an expanded view of a monitoring device for monitoring crop yield according to an embodiment.
Figure 4:
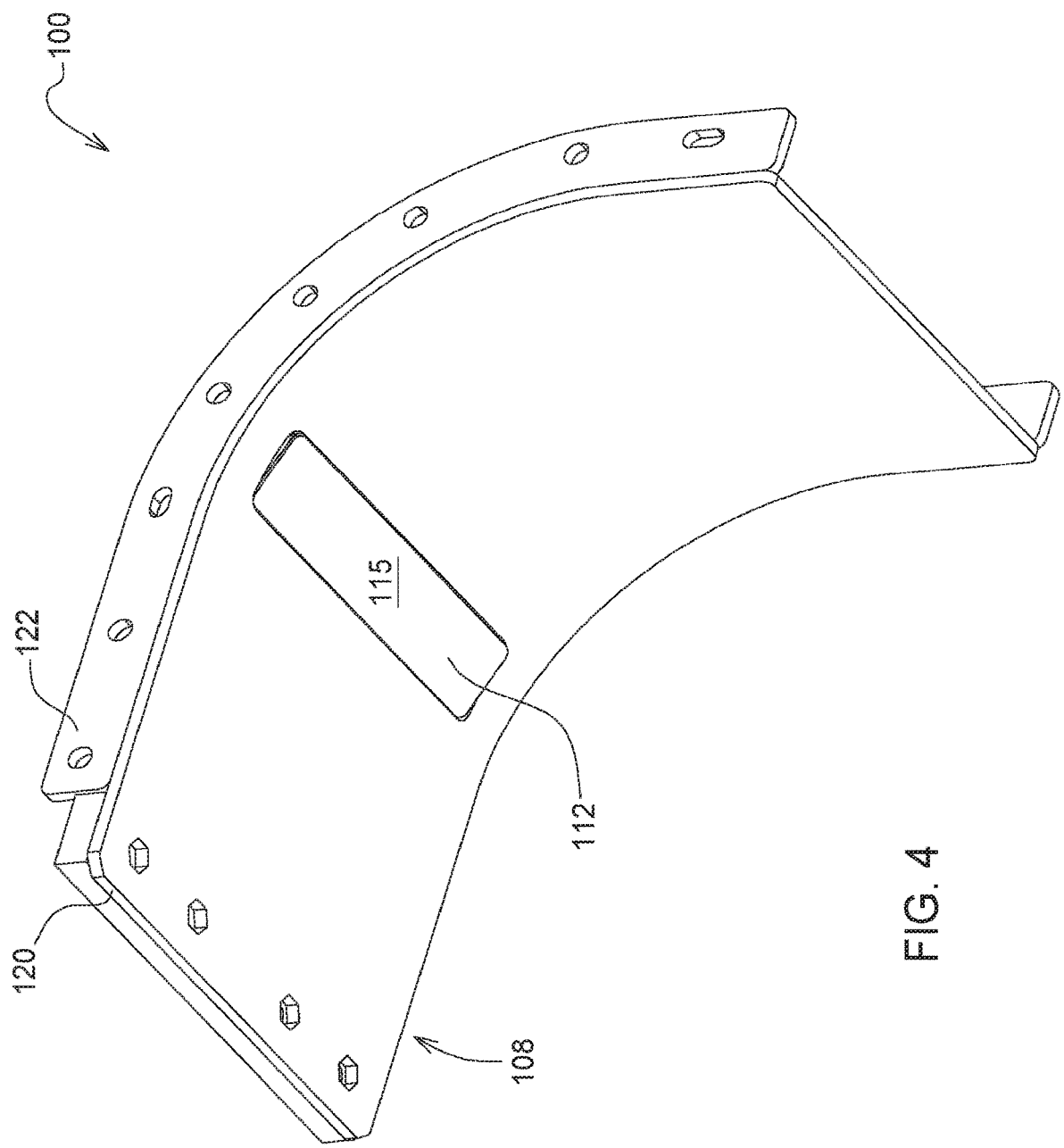
FIG. 4 is a bottom view of the monitoring device of FIG. 1 according to an embodiment.

The material engagement member 102 (e.g., a rocker arm) is coupled to the mounting structure 108 and can be arranged to extend between a first end and a second end. In some embodiments, the material engagement member 102 can comprise a first engagement member 110 fixedly or removably to a second engagement member 112. The first engagement member 110 can comprise a beam or cantilever-like structure that is coupled in flushed relation to the second engagement member 112 at either or both of the first and second ends 111, 113 (FIG. 3). A counterweight 105 can be arranged at least one of the first or second ends 111, 113 of the material engagement member 102 for balancing a weight distribution of the material engagement member 102 in either a first position or a second position.

At least one cylindrical groove 114 can be defined within the first engagement member 110 and is adapted to receive an elastic member 116 such as an elongate spring (e.g., a coil spring, torsional spring, Belleville washer, etc.) having a restoring force. The elastic member 116 is arranged to bias the material engagement member 102 in a given direction and to apply a restoring force to pivot the material engagement member 102 to a return position (i.e., null position) when the material engagement member 102 is pivotally displaced from the mounting structure 108. For example, the first engagement member 110 can be arranged to extend above the fulcrum assembly 104 and is pivotal with respect to the mounting structure 108 about a fulcrum element 130 of the fulcrum assembly 104. A shaft receiving channel 218 (FIG. 5B) can be formed in or on a pivot surface of the first engagement member 110 and is adapted to engage a complementary surface of the fulcrum element 130.

As shown in FIG. 3, in embodiments, the fulcrum assembly 104 can comprise the fulcrum element 130 attached to a base assembly 132. The fulcrum element 130 can comprise a rotating shaft or similar structure that is arranged to pivot about a rotational axis 137 without translation, wherein the rotational axis 137 is arranged substantially parallel to a planar surface of the base assembly 132. The base assembly 132 can comprise a support substrate 135 comprising one or more mounting apertures arranged to receive fastener elements 134 (e.g., bolts or screws) to permit mounting of the base assembly 132 to the mounting structure 108. At least one sensor cavity 136 can be arranged on an outer portion of the base assembly 132 to secure placement and positioning of one or more of the rotational sensors 106.

Although in embodiments herein, the at least one rotational sensor 106 will be shown positioned in the one or more sensor cavities 136 arranged on the base assembly 132, in other embodiments, it is also possible for sensor 106 to be arranged on the mounting structure 108 or other support structures.

The at least one rotational sensor 106 is arranged to detect spatial movement or position of the material engagement member 102 relative to the fulcrum element 130 (i.e., pivot point) and is communicatively coupled to a processing device 107. The processing device 107 can comprise a microprocessor, a microcontroller, a digital signal processor, a programmable logic controller, or other suitable computing devices and can be arranged locally on the agricultural work machine as shown or remotely at a remote processing facility. In various embodiments, and as will be discussed with reference to FIG. 9, the at least one rotational sensor 106 can comprise a variety of sensors including, but not limited to, potentiometers, encoders, magneto-resistive sensors, magnetic proximity sensors, optical sensors, acoustic sensors, Hall-effect sensors, inductive sensors, or combinations thereof.

As will be appreciated by those skilled in the art, FIGS. 1A and 1B are provided merely for illustrative and exemplary purposes and is in no way intended to limit the present disclosure or its applications. In other embodiments, the arrangement and/or structural configuration of monitoring device 100 can and will vary. For example, the location and positioning of the monitoring device 100 can be shifted to the left or right of the illustrated embodiments. In some embodiments, the monitoring device 100 can comprise fewer or more sensors (e.g., rotational sensors, gravimetric sensors, or others) as will be discussed in further detail with reference to FIG. 6. Additionally, the location and arrangement of the fulcrum assembly 104 can and will vary in various embodiments. In some embodiments, the fulcrum assembly 104 can be centrally arranged on the mounting structure 108 to permit hinged (FIG. 2) or central coupling of the material engagement member 102, which allows for pivotal or see-saw like movement of the material engagement member 102. In other embodiments, the fulcrum assembly 104 can be positioned to either the left or right of the mounting structure 108 to also permit hinged coupling of the material engagement member 102. In still other embodiments, the monitoring device 100 can be arranged to exclude the fulcrum assembly 104. In such an arrangement, each of the first and second ends 111, 113 of the material engagement member 102 can be fixedly coupled to the mounting structure 108 such that any force acting on the engagement member 112 by the agricultural material 432 will be transformed from a kinetic energy form to another energy form.

Figure 5A:
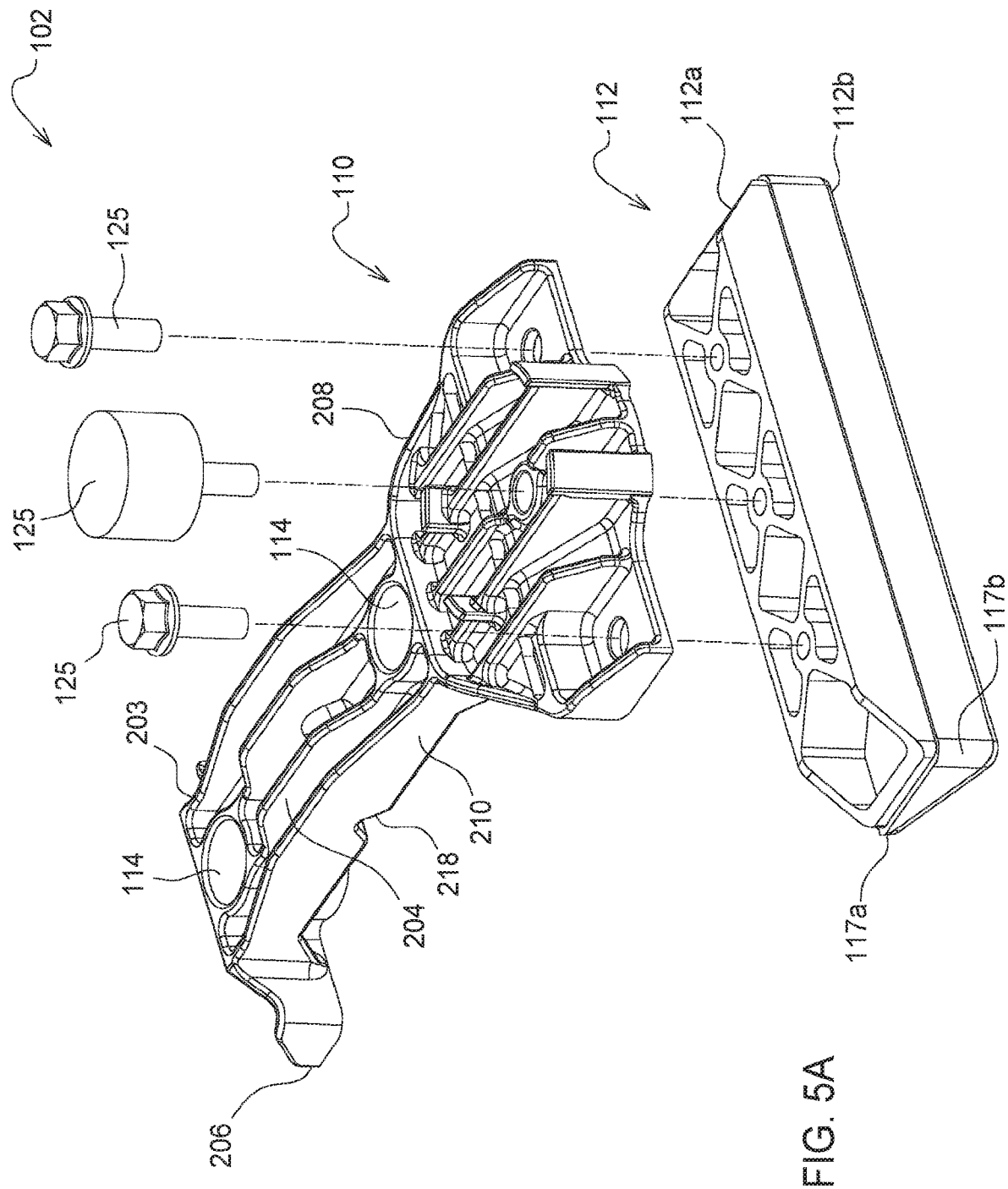
FIG. 5A is an expanded perspective view of a material engagement member arranged in the monitoring device of FIG. 1 according to an embodiment.
Figure 5B:
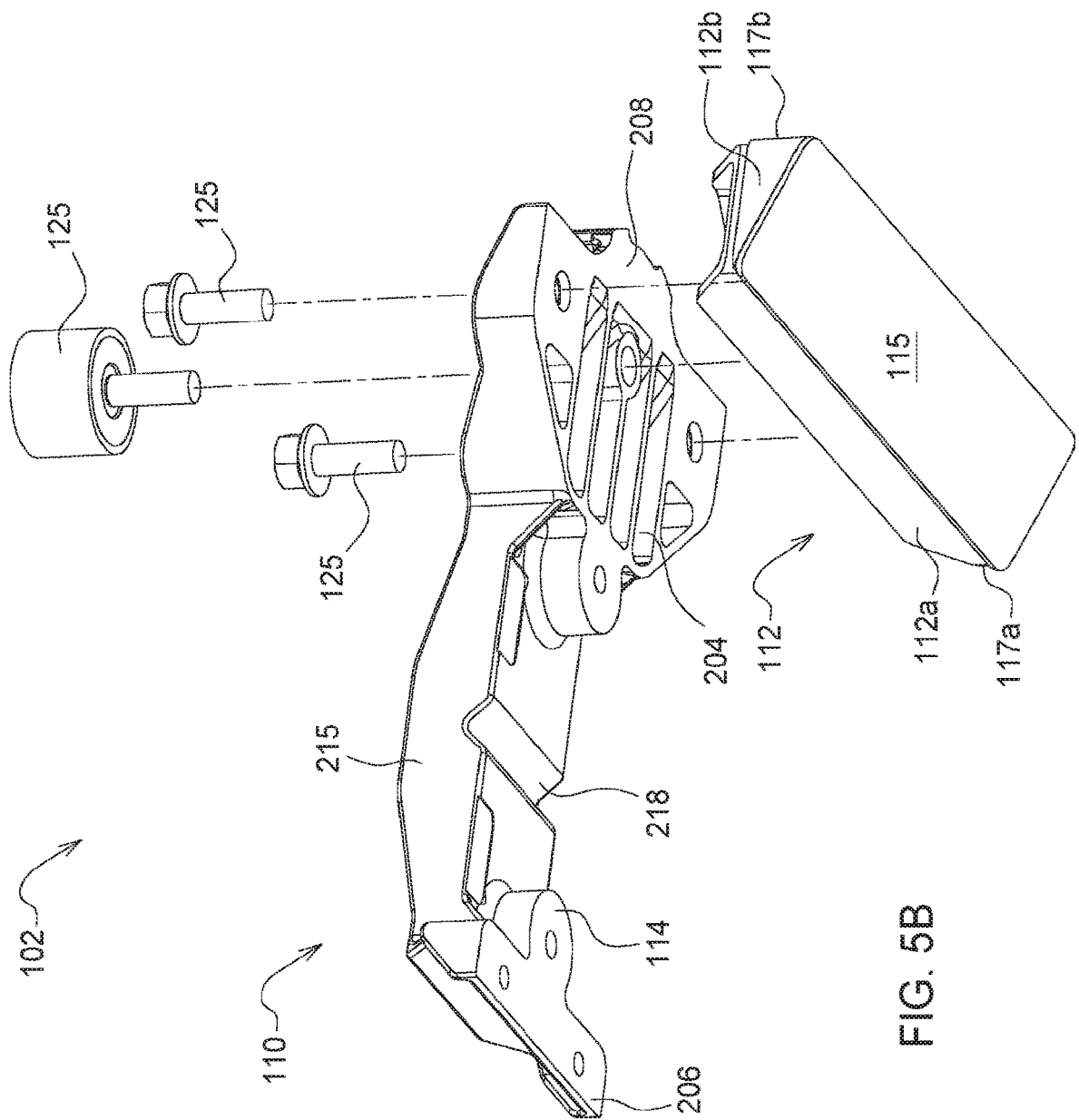
FIG. 5B is an expanded side view of the material engagement member of FIG. 5A according to an embodiment.
Figure 5C:
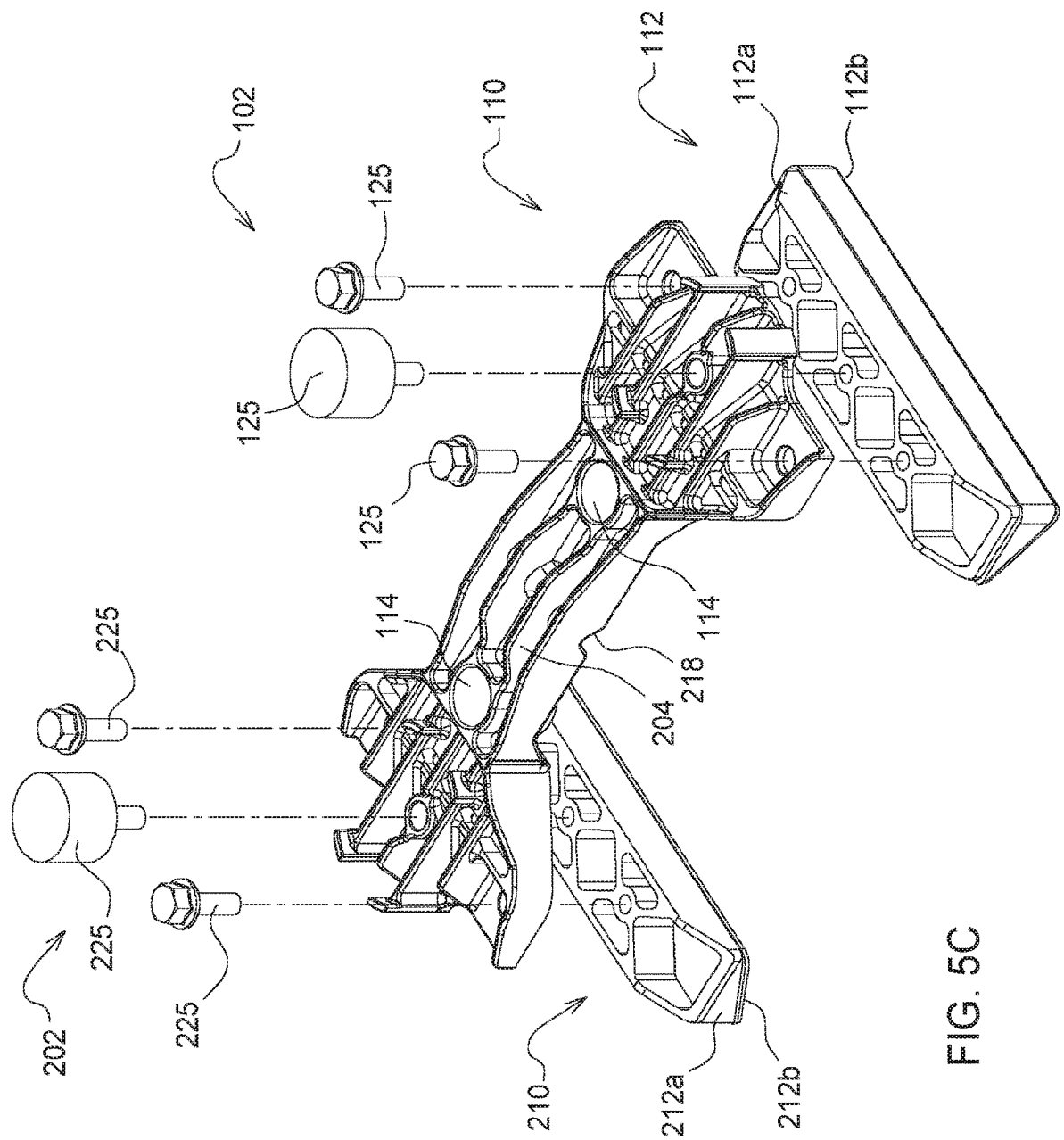
FIG. 5C is an expanded side view of a material engagement member arranged in the monitoring device of FIG. 1 according to an embodiment.

Referring to FIGS. 5A-5C, the first engagement member 110 of the material engagement member 102 is shown in further detail. As illustrated, the first engagement member 110 can comprise a center portion 210 integrally coupled to a first coupling element 206 and a second coupling element 208. The size and dimensions of the first and second coupling elements 206, 208 will vary in various embodiments based on the structural arrangement of the material engagement member 102. For example, in some embodiments, the first and second coupling elements 206, 208 will be sized relative to a length of the second engagement member 112 (refer, e.g., to FIGS. 5B and 5C), as well as based on a type of coupling arrangement (i.e., hinged or central coupling) as discussed above.

In embodiments, the first engagement member 110 can comprise a rigid material, such as aluminum, steel, or other suitable metallic materials having sufficient resiliency to resist bending and/or flexing of member 110. Additionally, a stiffening element 203 can be formed in or on at least one surface of the first engagement member 110 and can comprise a plurality of recessed grooves 204 adjacently arranged to further facilitate increased rigidity and stiffening of the first engagement member 110, while also facilitating a reduction in structural weight. Such an arrangement is particularly advantageous in that motion of the material engagement member 102 is restricted to rotational or pivotal motion on the fulcrum element 130, which substantially decreases its susceptibility to unwanted noise or vibrations.

As shown in FIGS. 3 and 5A, the second engagement member 112 can comprise a force plate having a first portion 112a adhesively coupled to a second portion 112b, however, other suitable coupling techniques may be employed. For example, in other embodiments, the first and second portions 112a, 112b can be connected utilizing techniques such as thermal coupling, soldering, lamination, or the like. The first portion 112a can comprise a metallic material, such as aluminum or steel, whereas the second portion 112b, due to its positioning, can comprise a material that is more resistant to abrasive wear (e.g., ceramics) as compared to the first portion 112a. The second portion 112b can comprise an angled surface 115 (e.g., an arced or sloped surface) having a leading edge 117a and a trailing edge 117b that is angled with respect to an outer surface of the mounting structure 108. In some embodiments, the leading edge 117a can be recessed approximately 1 mm from the outer surface of the mounting structure 108 and the trailing edge 117b can be arranged to extend approximately 1 mm from the outer surface of the mounting structure 108. This is done primarily to minimize wear and to protect the angled surface 115 from having direct impact with a moving mass of agricultural material 432. For example, the angled surface 115 is arranged such that the force exerted by the mass of agricultural material 432 on the angled surface will be concentrated towards a center.

As discussed with reference to FIGS. 1A and 1B, and referring now to FIG. 6, in some embodiments, the monitoring device 100 can further comprise an adjustment mechanism 320 coupled to the second engagement member 112. The adjustment mechanism 320 can comprise an actuation device such as a drive motor coupled to a threaded screw shaft (not shown) and arranged to two-dimensionally adjust a position of the second engagement member 112. The driver motor can be communicatively coupled to the processing device 107 such that upon receipt of a control signal a null position (i.e., default position without impact) of the material engagement member 102 is rotationally or translationally adjusted. Such an arrangement is particularly advantageous in that it helps to improve the measurement accuracy and performance of the monitoring device 106 for a variety of crops, sensor pitches or rolls of the monitoring device 100 relative to gravity; or for various measurement ranges of the monitoring device 100 for a given agricultural material. For example, a characteristic response of the second engagement member 112 can be modified by dynamically adjusting the position of the second engagement member 112 based on a mass flow rate of the agricultural material 432.

In other embodiments, the monitoring device 100 can comprise an adjustable damping mechanism or dashpot (not shown) that operates to change a range of applied force that results in the material engagement member 102 moving the full range of rotational magnitude. For example, a first dashpot setting can be used with low mass flow rate crops such as small grains, whereas a second dashpot setting can be used with high mass flow rate crops such as corn. Other examples include having a range of settings for various crops for the mechanism. In still other embodiments, rather than performing a null position adjustment, the monitoring device 100 can comprise a gravimetric sensor (not shown) that is configured to detect the position of the material engagement member 102 relative to the earth's gravity. In such an arrangement, the relative gravimetric data is transmitted from the gravimetric sensor to the processing device 107 for dynamic scaling or initial calibration of the data.

Referring to FIGS. 7-8, an exemplary embodiment of the agricultural work machine 400 (e.g., a harvester) in which the monitoring device 100 of FIGS. 1A and 1B is arranged is shown. As depicted, the agricultural work machine 400 can comprise a vehicle frame 402 having ground engaging elements 404 extending from the vehicle frame 402. To control operations of the agricultural work machine 400, an operator's cab 410 can be arranged atop of the vehicle frame 402.

A harvesting apparatus 412 is arranged to extend forward of the agricultural work machine 400 and can comprise a harvesting platform 414, a feederhouse 416, and a beater 418. The harvesting platform 414 can be arranged at a lower end of the harvesting apparatus 412 and is used for harvesting the agricultural material 432. The feederhouse 416 can be interposedly arranged between the harvesting platform 414 and the beater 418 to direct the agricultural material 432 received by the of the harvesting apparatus 412 upwardly through an inlet transition section 420 to a crop processing unit 422.

A material separation system 426, which removes chaff from the agricultural material 432, can be arranged beneath the crop processing unit 422 and coupled to a lower end of the crop conveyor assembly 424 as shown in FIG. 3. The crop conveyer assembly can comprise a plurality of movable members attached to a rotating mechanism 434 (e.g., belt or chain and cog or pulley), which are to extend outwardly and away from a center axis 137 of the rotating mechanism 434. As will be appreciated by one skilled in the art, FIG. 3 is not drawn to scale and the illustrated embodiment is merely for exemplary purposes to facilitate explanation of the material separation system 426. For example, although not shown, in various embodiments, each of the movable members 430 can and will comprise a generally curved or arcuate shaped configuration.

As depicted, the plurality of movable members 430 of the crop conveyor assembly 424 receives the separated material and directs the agricultural material 432 to a transition area 427 where the agricultural material 432 engages with the material engagement member 102 and is supplied to a loading auger 434 for loading into a material tank 450. In some embodiments, the agricultural vehicle can further comprise a location determining receiver 436 arranged on the operator's cab 410 for receiving location/positioning signals.

Figure 9:
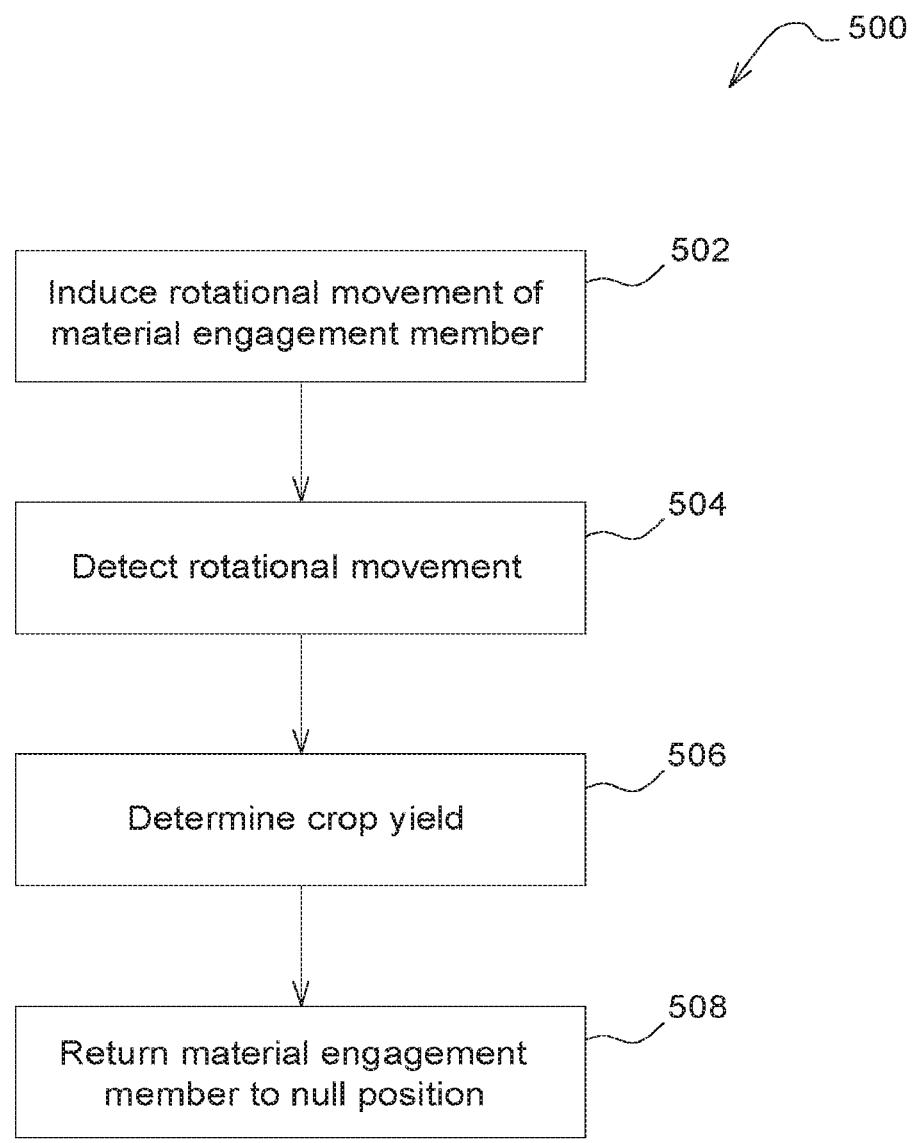
FIG. 9 is a flow diagram of a method for determining a crop yield utilizing the monitoring device of FIG. 1.

Referring to FIG. 9, a flow diagram of a method 500 for monitoring crop yield is shown. In operation, as the agricultural material 432 is transferred from the material separation system 426 to the movable members 430, the agricultural material 432 is conveyed clockwise and upward by the crop conveyor assembly 424 to the material engagement member 102. For example, once the agricultural material 432 reaches an upper end of the crop conveyor assembly 424, the agricultural material 432 is thrown from the movable members 430 to the material engagement member 102.

As illustrated in FIG. 8, at 502, an angular force (e.g., centripetal force) is exerted upon the angled surface 115 of the second engagement member 112 as the agricultural material 432 impacts the surface, thereby inducing rotational or pivotal movement of each edge 117a, 117b of the angled surface 115 relative to one another. Rotational and pivotal movement of the first end 111 and/or the second end 113 is also induced as a result of the impact. As previously discussed, such rotational or pivotal movement will be determined, in part, based on the coupling arrangement (e.g., hinged or central coupling) of the material engagement member 102. For example, upon engagement in a hinged coupling arrangement, either the first end 111 or second end 113 will be disproportionally displaced relative to one another about the fulcrum element 112 (i.e., the two ends do not move equal distances relative to one another such that the rotational magnitude of displacement of each is disproportionate to the other). In a central coupling arrangement, however, both ends 111, 113 will be disproportionally displaced in a seesaw-like manner relative to one another.

At 504, the at least one rotational sensor is configured to measure a rotational magnitude of the displacement of the material engagement member 102. The rotational magnitude of the displacement will vary based on a level of impact. For example, a maximum rotational magnitude will result when the material engagement member is upwardly displaced (e.g., high grain impact), and a minimum rotational magnitude will result when the material engagement member 102 is in a downward position (trailing edge 117b extends beyond mounting structure 108) or at rest. In one embodiment, the at least one rotational sensor 106 can comprise potentiometers, rotary encoders, integrated magneto-resistive sensors, Hall encoders, combinations thereof, or other suitable sensors that are configured to detect an angular change of the material engagement member 102 relative to the fulcrum assembly 104. It should be noted, however, that the type of sensor employed will vary based on a desired measurement output.

For example, in other embodiments, the at least one rotational sensor 106 can be configured to detect a change in a position of the material engagement member 102 relative to the sensor 106 in either a differential or non-differential sensing mode. As referred to herein, the "non-differential sensing mode" includes a mode in which one or more sensors output measurement signals that are individually processed. In contrast, the "differential sensing mode" includes a mode in which two or more sensors simultaneously output measurement signals which are subtracted to yield a measurement free of common-mode error. For example, in a differential sensing mode, the at least one rotational sensor 106 can comprise two or more sensors arranged on opposing sides of the fulcrum element 130 that are configured to detect a change in a distance (i.e., spatial gap) of the material engagement member 102 relative to the sensors. Use of the two or more sensors in the differential sensing mode can help to mitigate error, for example, without limitation, from common mode vibration of the material engagement member 102, or temperature drift of the sensors. In either sensing mode, the at least one rotational sensor 106 can comprise one or more of the following sensors: linear potentiometers, magnetic proximity sensors, optical distance sensors, ultrasonic sensors, Hall effect sensors, inductive sensors, giant magneto-resistive sensors, or the like. At 506, based upon the measured rotational magnitude, the processing device 107 can determine a crop yield and generate an output of an aggregate crop yield for display on a user interface arranged in the operator's cab 410. For example, the processing device 107 first determines a mass flow rate of the agricultural material 432 based on the rotational magnitude of the displacement, which is then used to determine the crop yield.

Next at 508, the elastic member 116 operates to apply a restorative force to the material engagement member 102 to return member 102 to a null position once the material engagement is displaced. For example, such displacement will result in a relatively small restoring force and as the displacement becomes greater the restoring force proportionally increases. In some embodiments, a spring constant of the elastic member 116 providing restorative force may be varied through means such as spring temperature, a torsional spring arranged on the fulcrum assembly 104 with an integrated electro-rheological or magneto-rheological fluid. The variable resistive force may be achieved with technologies such as variable pressure pneumatic dashpots, electro-rheological dashpots, magneto-rheological dashpots, or other suitable devices.

Without in any way limiting the scope, interpretation, or application of the claims appearing below, a technical effect of one or more of the example embodiments disclosed herein is a monitoring device for monitoring crop yield. Notably, the present disclosure has several advantages over conventional approaches, including, but not limited to, providing increased sensor resolution, providing scalability for a variety of crop types, effective cancellation of unwanted noise and vibrations.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A monitoring device for monitoring crop yield, the monitoring device comprising:
   a mounting structure to be mounted to a housing of a grain elevator of an agricultural work machine proximate a crop conveyor assembly arranged in the housing;
   a material engagement member pivotal with respect to the mounting structure about a pivot point, the material engagement member having a first end and a second end opposite of the first end, wherein the material engagement member includes a first engagement member coupled to a second engagement member, wherein the first engagement member is arranged to extend in a cantilever-like structure between the first end and the second end, and wherein the second engagement member is arranged for movable insertion into an aperture of the mounting structure;
   an elastic member coupled to the material engagement member, the elastic member to apply a restorative force to the material engagement member when the material engagement member is displaced; and
   a rotational sensor to output a signal corresponding to a rotational magnitude of displacement of at least one of the first end or the second end relative to the pivot point, the signal for determination of a mass flow rate of an agricultural material, wherein the rotational magnitude of displacement is to be induced by an exertion of a force generated by the agricultural material engaged with a surface of at least of the first end or the second end of the material engagement member.

2. The monitoring device of claim 1, wherein the elastic member includes a first elastic member on a first side of the pivot point, and further including a second elastic member on a second side of the pivot point opposite of the first side.

3. The monitoring device of claim 1, wherein the mounting structure includes a semi-rigid material, and wherein the rotational sensor includes a plurality of sensors arranged along a surface the material engagement member to generate a distribution of a flow of agricultural material transverse to a direction of flow of the agricultural material.

4. The monitoring device of claim 1, wherein the first engagement member is coupled to the second engagement member at either the first end or the second end.

5. The monitoring device of claim 1, wherein the first engagement member is centrally coupled to the pivot point, and wherein the second engagement member is coupled to the first engagement member at the first end and the second end so that pivotal movement is induced by either the first end or the second end in a seesaw-like manner.

6. The monitoring device of claim 1, wherein at least one of the first end or the second end is fixedly coupled to the mounting structure to enable pivotal movement of the material engagement member in response to movement of a non-attached free end.

7. The monitoring device of claim 1, wherein the rotational magnitude of displacement is determined by at least one of the following:
measuring an angular change of the material engagement member;
measuring a change in position of the material engagement member relative to the rotational sensor in a non-differential sensing mode; or
measuring a change in position of the material engagement member relative to the rotational sensor in a differential sensing mode.

8. The monitoring device of claim 1, wherein a first rotational magnitude of displacement of the first end is disproportionate to a second rotational magnitude of displacement of the second end when the agricultural material is engaged with the material engagement member.

9. The monitoring device of claim 1, wherein the elastic member includes a spring.

10. The monitoring device of claim 9, wherein the elastic member includes an integrated electro-rheological or magneto-rheological fluid.

11. The monitoring device of claim 1, wherein the elastic member includes a dashpot.

12. A monitoring device for monitoring crop yield, the monitoring device comprising:
a mounting structure to be mounted to a housing of a grain elevator of an agricultural work machine proximate a crop conveyor assembly arranged in the housing;
a material engagement member pivotal with respect to the mounting structure about a pivot point, the material engagement member having a first end and a second end opposite of the first end;
an elastic member coupled to the material engagement member, the elastic member to apply a restorative force to the material engagement member when the material engagement member is displaced;
a rotational sensor to output a signal corresponding to a rotational magnitude of displacement of at least one of the first end or the second end relative to the pivot point, the signal for determination of a mass flow rate of an agricultural material, wherein the rotational magnitude of displacement is to be induced by an exertion of a force generated by the agricultural material engaged with a surface of at least of the first end or the second end of the material engagement member; and
an adjustment mechanism, to adjust a null position of the material engagement member based on the mass flow rate of the agricultural material.

13. The monitoring device of claim 12, wherein the material engagement member includes a first engagement member coupled to a second engagement member.

14. The monitoring device of claim 13, wherein the first engagement member is arranged to extend in a cantilever-like structure between the first end and the second end, and wherein the second engagement member is arranged for movable insertion into an aperture of the mounting structure.

15. A monitoring device for monitoring crop yield, the monitoring device comprising:
a mounting structure to be mounted to a housing of a grain elevator of an agricultural work machine proximate a crop conveyor assembly arranged in the housing;
a material engagement member pivotal with respect to the mounting structure about a fulcrum, the material engagement member having a first end and a second end opposite of the first end, the fulcrum positioned between the first and second ends to enable the material engagement member to pivot in a seesaw-like manner, wherein the material engagement member includes a first engagement member coupled to a second engagement member, wherein the first engagement member is arranged to extend in a cantilever-like structure between the first end and the second end, and wherein the second engagement member is arranged for movable insertion into an aperture of the mounting structure; and
a rotational sensor to output a signal corresponding to a rotational magnitude of displacement of at least one of the first end or the second end relative to the fulcrum, the signal for determination of a mass flow rate of an agricultural material, wherein the rotational magnitude of displacement is to be induced by an exertion of a force generated by the agricultural material engaged with a surface of at least of the first end or the second end of the material engagement member.

16. The monitoring device of claim 15, wherein the fulcrum includes a shaft having a rotational axis.

17. The monitoring device of claim 15, wherein the fulcrum at least partially defines hinged coupling of the material engagement member.

18. The monitoring device of claim 15, wherein the first engagement member is coupled to the second engagement member at the first end or the second end.

19. The monitoring device of claim 15, further including an elastic member coupled to the material engagement member, the elastic member to apply a restorative force to the material engagement member when the material engagement member is displaced.

20. The monitoring device of claim 15, wherein at least one of the first end or the second end is fixedly coupled to the mounting structure to enable pivotal movement of the material engagement member in response to movement of a non-attached free end.

21. The monitoring device of claim 15, wherein the rotational magnitude of displacement is determined by at least one of the following:
measuring an angular change of the material engagement member;
measuring a change in position of the material engagement member relative to the rotational sensor in a non-differential sensing mode; or
measuring a change in position of the material engagement member relative to the rotational sensor in a differential sensing mode.

22. The monitoring device of claim 15, wherein a first rotational magnitude of displacement of the first end is disproportionate to a second rotational magnitude of displacement of the second end when the agricultural material is engaged with the material engagement member.

23. The monitoring device of claim 15, wherein the mounting structure includes a semi-rigid material, and wherein the rotational sensor includes a plurality of sensors arranged along a surface the material engagement member to generate a distribution of a flow of agricultural material transverse to a direction of flow of the agricultural material.

24. A monitoring device for monitoring crop yield, the monitoring device comprising:
    a mounting structure to be mounted to a housing of a grain elevator of an agricultural work machine proximate a crop conveyor assembly arranged in the housing;
    a material engagement member pivotal with respect to the mounting structure about a fulcrum, the material engagement member having a first end and a second end opposite of the first end, the fulcrum positioned between the first and second ends to enable the material engagement member to pivot in a seesaw-like manner; and
    a rotational sensor to output a signal corresponding to a rotational magnitude of displacement of at least one of the first end or the second end relative to the fulcrum, the signal for determination of a mass flow rate of an agricultural material, wherein the rotational magnitude of displacement is to be induced by an exertion of a force generated by the agricultural material engaged with a surface of at least of the first end or the second end of the material engagement member; and
    an adjustment mechanism to adjust a null position of the material engagement member based on the mass flow rate of the agricultural material.

25. The monitoring device of claim 24, wherein the material engagement member includes a first engagement member coupled to a second engagement member.

26. The monitoring device of claim 25, wherein the first engagement member is arranged to extend in a cantilever-like structure between the first end and the second end, and wherein the second engagement member is arranged for movable insertion into an aperture of the mounting structure.

27. A monitoring device for monitoring crop yield, the monitoring device comprising:
    a mounting structure to be mounted to a housing of a grain elevator of an agricultural work machine proximate a crop conveyor assembly arranged in the housing;
    a material engagement member pivotal with respect to the mounting structure about a fulcrum, the material engagement member having a first end and a second end opposite of the first end, the fulcrum positioned between the first and second ends to enable the material engagement member to pivot in a seesaw-like manner, wherein the material engagement member includes a first engagement member coupled to a second engagement member, wherein the first engagement member is centrally coupled to the fulcrum, and wherein the second engagement member is coupled to the first engagement member at the first end and the second end so that pivotal movement is induced by the first end or the second end; and
    a rotational sensor to output a signal corresponding to a rotational magnitude of displacement of at least one of the first end or the second end relative to the fulcrum, the signal for determination of a mass flow rate of an agricultural material, wherein the rotational magnitude of displacement is to be induced by an exertion of a force generated by the agricultural material engaged with a surface of at least of the first end or the second end of the material engagement member.

* * * * *